United States Patent [19]

Norris et al.

[11] Patent Number: 4,540,256
[45] Date of Patent: Sep. 10, 1985

[54] MOTION PICTURE FILM CARD

[75] Inventors: Philip R. Norris, North Reading; Richard R. Wareham, Marblehead, both of Mass.

[73] Assignee: Polaroid Corporation, Cambridge, Mass.

[21] Appl. No.: 139,867

[22] Filed: Apr. 14, 1980

Related U.S. Application Data

[62] Division of Ser. No. 47,024, Jun. 11, 1979, Pat. No. 4,253,748.

[51] Int. Cl.³ .............................................. G03C 1/76
[52] U.S. Cl. ...................................... 352/239; 352/82
[58] Field of Search .................. 352/82, 83, 102, 103, 352/232, 239, 38, 44

[56] References Cited

U.S. PATENT DOCUMENTS

| | | |
|---|---|---|
| 1,210,887 | 1/1917 | Bettini . |
| 1,231,961 | 7/1917 | Stoffels . |
| 1,933,057 | 10/1933 | Harkin . |
| 2,461,756 | 2/1949 | Moore ................................ 352/102 |
| 2,950,644 | 8/1960 | Land et al. . |
| 3,218,114 | 11/1965 | Grey . |
| 3,282,186 | 11/1966 | Niccolls . |
| 3,450,468 | 6/1969 | Davidson et al. . |
| 3,459,111 | 8/1969 | Cooper . |
| 3,984,850 | 10/1976 | Bley . |
| 4,140,381 | 2/1979 | Douglas . |

Primary Examiner—Monroe H. Hayes
Attorney, Agent, or Firm—David R. Thornton

[57] ABSTRACT

A photographic method and apparatus for producing a motion picture including moving a film unit in one direction and the optics system along an arcuate path generally laterally thereto so as to produce a plurality of images on the film unit. The camera utilizes means for intermittently moving the film unit, such as a film card, in a first direction with the image produced in sequence in a plurality of parallel, arcuate rows generally laterally of the first direction. Alternate rows of images are produced along a first lateral direction while intervening rows thereof are produced along a second lateral direction opposite to the first one.

3 Claims, 19 Drawing Figures

MOTION PICTURE FILM CARD

This is a division of application Ser. No. 47,024, filed June 11, 1979 now U.S. Pat. No. 4,253,748.

BACKGROUND OF THE INVENTION

This invention relates generally to motion picture taking systems and, more particularly, to systems which utilize a plurality of separate film transparency units as opposed to utilizing continuous reels of film therefor.

Present day motion picture taking and projection systems utilize continuous reels of film in which a plurality of sequentially produced images are vertically positioned along a continuous film roll during the picture taking process, reels of 50 feet, 100 feet, 500 feet, 1000 feet, etc. being utilized to store such rolls of film images. During projection each of the sequentially filmed image transparencies are intermittently projected via an appropriate projection system at a rate which provides a substantially continuous motion of the projected image on a screen.

A problem in such conventional motion picture systems lies in the difficulty in evaluating a scene which has been taken until the entire film roll has been utilized and developed for projection. Even where substantially instantaneous development can be achieved such evaluation must often await the projection of a significant portion of a film roll containing a large number of different scenes before a particular scene can be looked at for such evaluation.

It is desirable, therefore, to design a motion picture taking system in which scenes of average length (e.g., the time of an average scene is often about 10–15 seconds) can be more easily evaluated without having to review other scenes of no particular interest at the time. Such a design should also make it possible to view such relatively short scenes substantially immediately after taking, either in transparency form or in projected form.

One approach to such a problem which has been suggested in the past is to form a plurality of sequentially produced images on a relatively larger transparency film unit, or plate. An entire motion picture can be obtained by providing a plurality of such plates for sequential use in taking or projecting. Such systems have not found favor because the format of such sequentially produced images on the plate and the mechanisms for producing such format have not been acceptable in terms of the size or capability thereof to produce effective motion picture image projection.

For example, some techniques have suggested the use of a fixed lens system coupled with a movable plate, the latter being capable of movement in two orthogonal directions so that the multiple images are placed thereon in parallel rows. Since the plate must move from one side to the other as it passes adjacent the lens system, the camera housing must be at least twice the width of the plate itself and, hence, the size of the camera has become so unwieldy that its use is awkward and undesirable. Other suggested techniques using a substantially fixed optics system have required the photographic plate to be moved in a spiral or ring configuration which requires rather complex mechanical structures for guiding the plate movement in the correct direction.

Still other suggestions have involved the use of systems where both the plate and the optics system move, the plate normally moving in a first direction and the optics moving in an orthogonal direction. In such cases the plate remains in a fixed position while the lens system, in effect, scans the plate in a fixed linear direction orthogonal to the plate's motion, the plate moving forward between each orthogonal scan so that parallel rows of images are obtained. At the end of each lateral orthogonal scan the optics is required either to fly back rapidly to its initial position for the next scan or to scan in the opposite direction for alternate rows of images. Placing the images on the film in parallel rows utilizing a moving lens axis, the translational motion of the lens being either perpendicular or parallel to the lens viewing axis, tends to cause an uncomfortable illusion of rhythmic camera motion when viewed. Moreover, the lens axis in either case (whether the lens axis is parallel or perpendicular to the optics system motion) changes position with respect to the scene being taken.

In view of such problems it is desirable to design a system utilizing a plurality of film transparency units, each of which has multiple images thereon, in which the camera, or picture taking unit, can be held to a reasonable size for handling during operation and for storage and in which the illusion of rhythmic camera motion in the subsequent projection of the motion picture can be avoided. Moreover, it is desirable that the lens axis being taken be maintained in a fixed position relative to the camera housing during the picture taking process so that the distance and direction to the subject being taken remains the same so long as the camera itself is not moved. Such a system should be further designed and packaged so that the cost thereof is within the reasonable reach of the consumer market.

Further, it is desirable that one or more scenes which are taken by the camera be capable of being viewed either as transparencies, as prints, or as projected images substantially immediately so that individual scenes or sequences thereof can be evaluated quickly and retaken if desired, for example. Moreover, it is desirable that such a camera be useful for taking a large number of high resolution transparent still pictures on the same film card unit, or for use other than as a motion picture camera, if desired.

SUMMARY OF THE INVENTION

In accordance with the invention, a picture taking apparatus utilizes an optics system in the form of a movable boom which provides a plurality of images placed on one or more separate film units in the form of parallel arcuate rows. Subsequent to completion of exposure of the last image of a given row, the film unit is advanced a short distance and the optics scanned in a reverse direction to provide another row of sequential images. This produces a film unit having a plurality of sequentially recorded images formed in arcuate rows successively spaced along the length of the film unit.

Hence, each sweep of the boom produces a plurality of sequential images in an arcuate, or crescent-shaped, pattern on the film transparency unit. After each sweep, the film is advanced prior to or during the initial time of the boom's return sweep so that the next arcuate row of images will be produced substantially parallel to the previously produced row thereof.

Because of such a structure the size of the overall camera housing can be kept to reasonable dimensions and the camera can be relatively easily handled by an operator and, in fact, will be no more awkward or difficult to use than a conventional reel type motion picture camera now available. Each film transparency unit, for example, can have similar construction as the type presently used in "instant" still cameras of the Polaroid SX-70 type. Each image frame produced on a film transparency unit can be of a Super 8 size motion picture format and in a particular embodiment approximately two hundred such frames can be placed on a single SX-70 size film unit to provide about twelve seconds of continuous motion.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figures 1, 2:
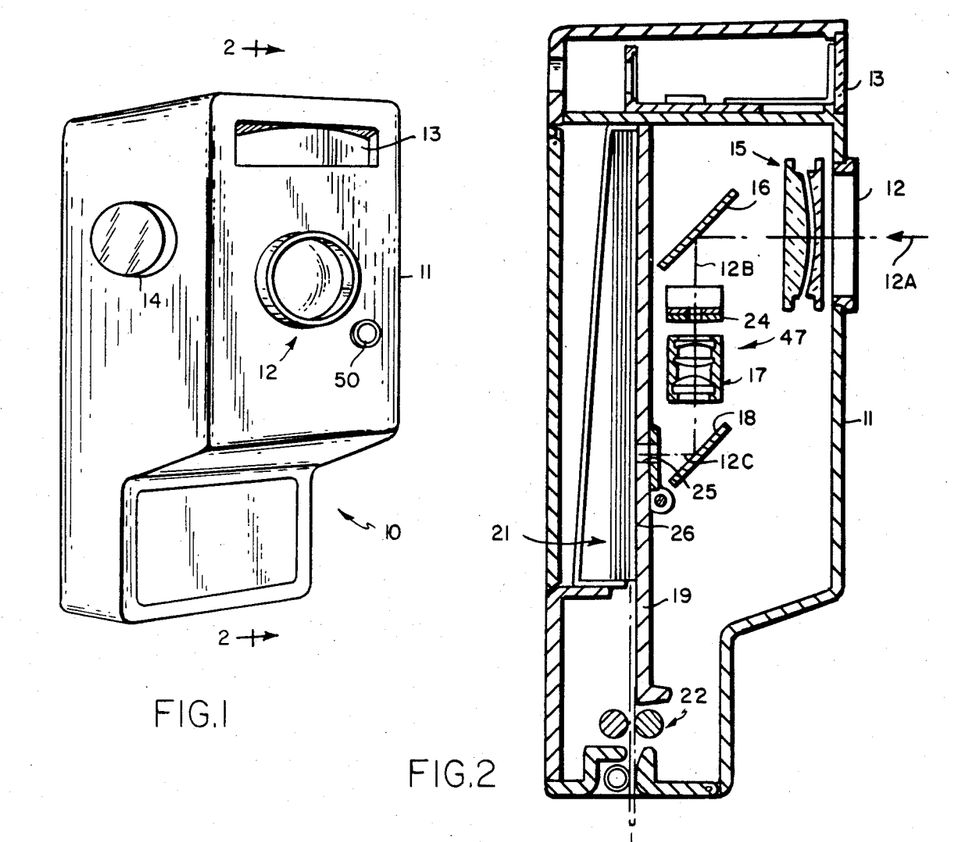
FIG. 1 shows an external perspective view of a camera which represents a particular embodiment of the invention.
FIG. 2 is a diagrammatic view in section taken along the line 2—2 of FIG. 1.
Figure 3:
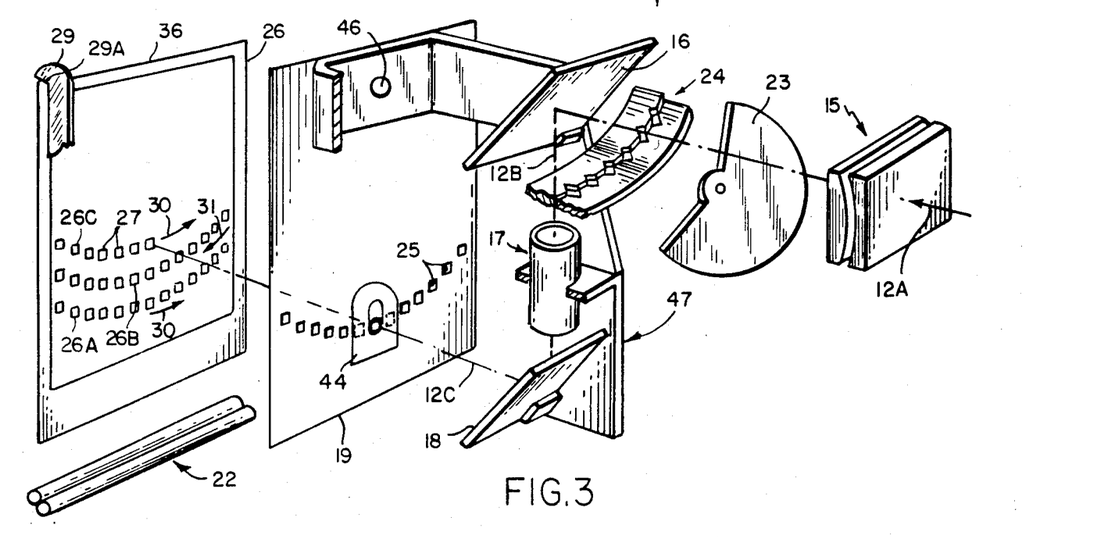
FIG. 3 is a diagrammatic view of certain elements of the camera embodiment of FIGS. 1 and 2.
Figure 4:
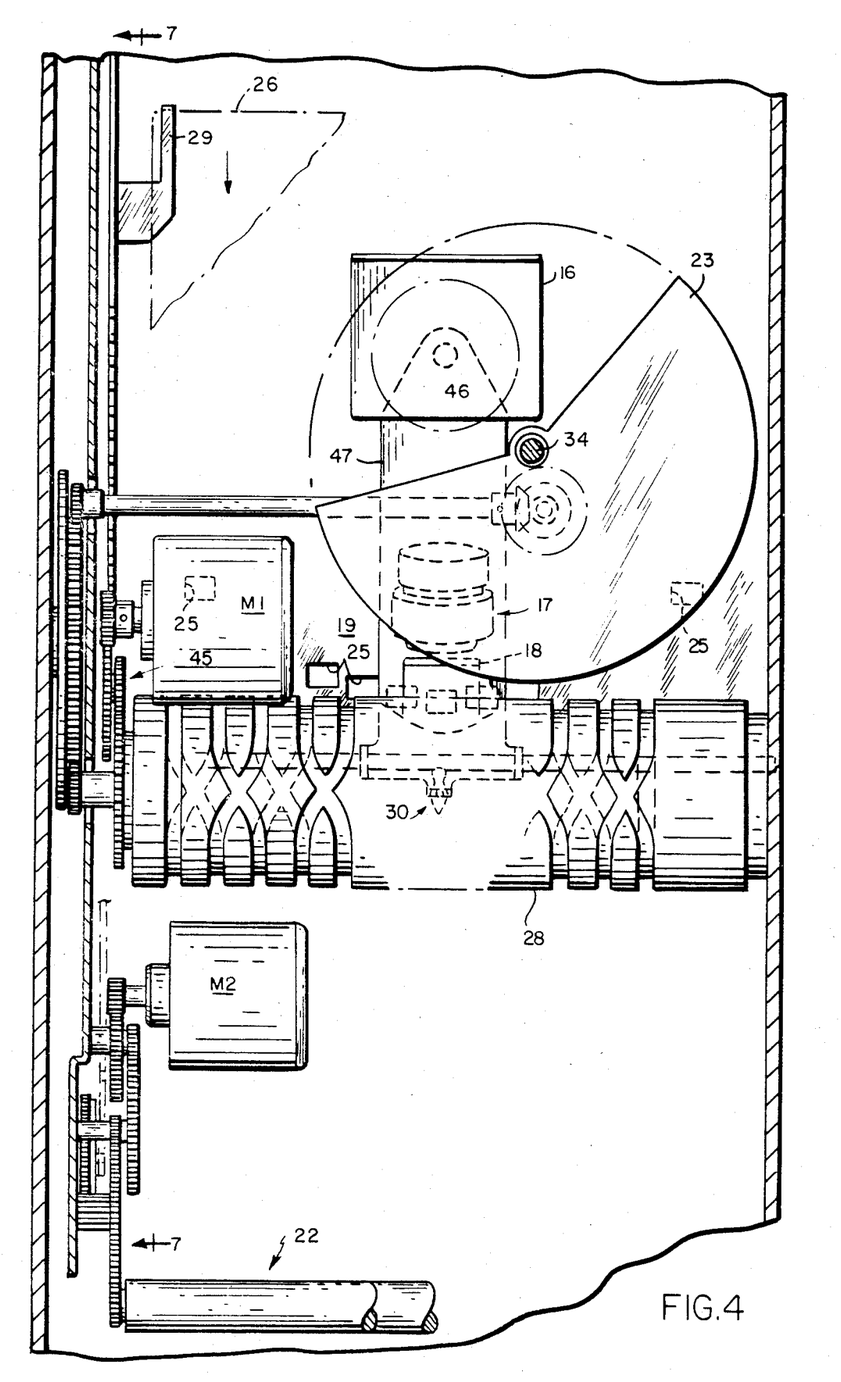
FIG. 4 is a view in section along the line 4—4 of FIG. 5.
Figure 5:
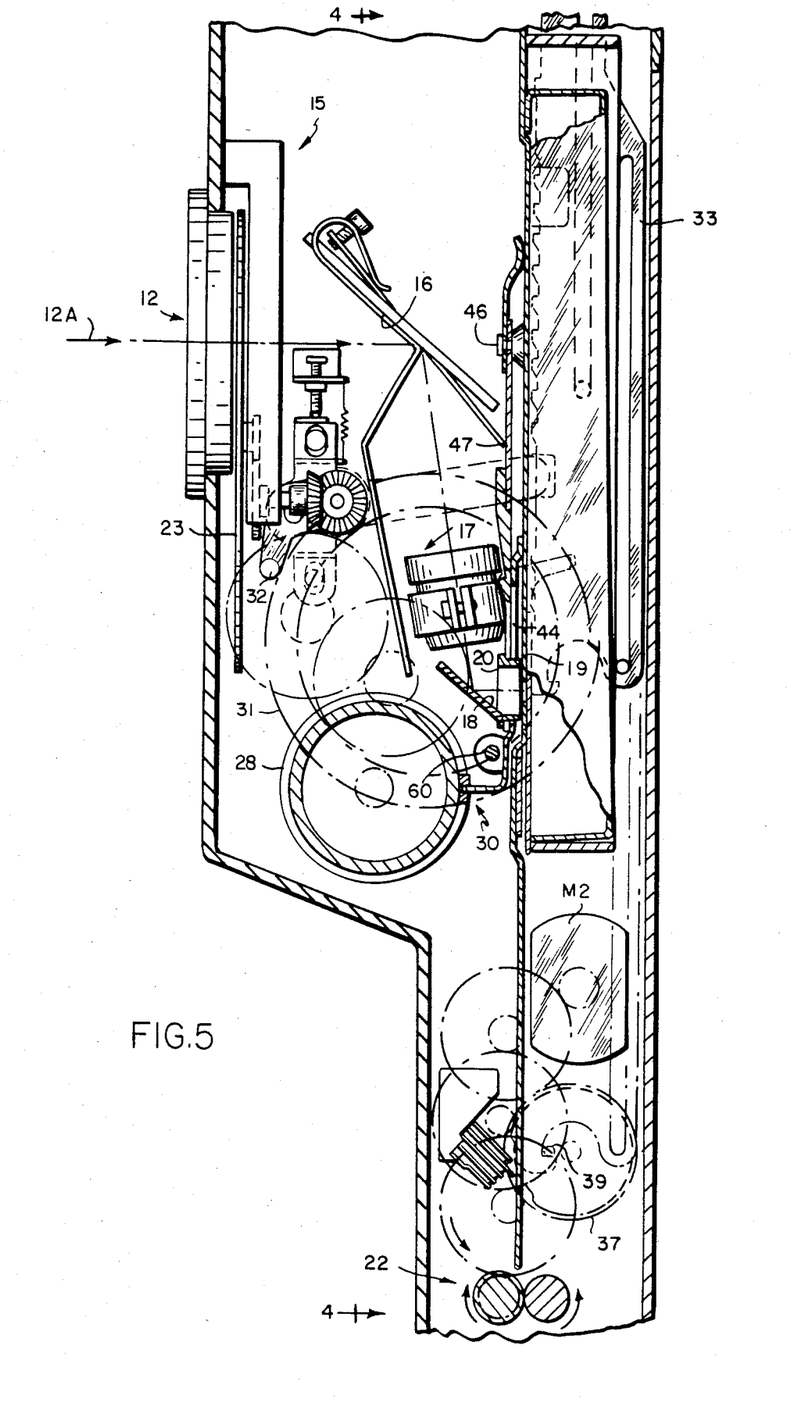
FIG. 5 is a view in section similar to that of FIG. 2 and illustrating the optical boom arrangement of the camera of FIG. 1 in more detail.

As can be seen in the diagrammatic view of FIGS. 1-3, a camera 10 in accordance with the invention includes a housing 11 having a lens aperture 12 for accepting incoming light rays from a scene being taken and a viewing aperture 13 for use with a range finder to permit the user thereof to view the scene being taken and to set the distance to the subject by dial 14 in accordance with conventional practice.

Figures 8, 9:
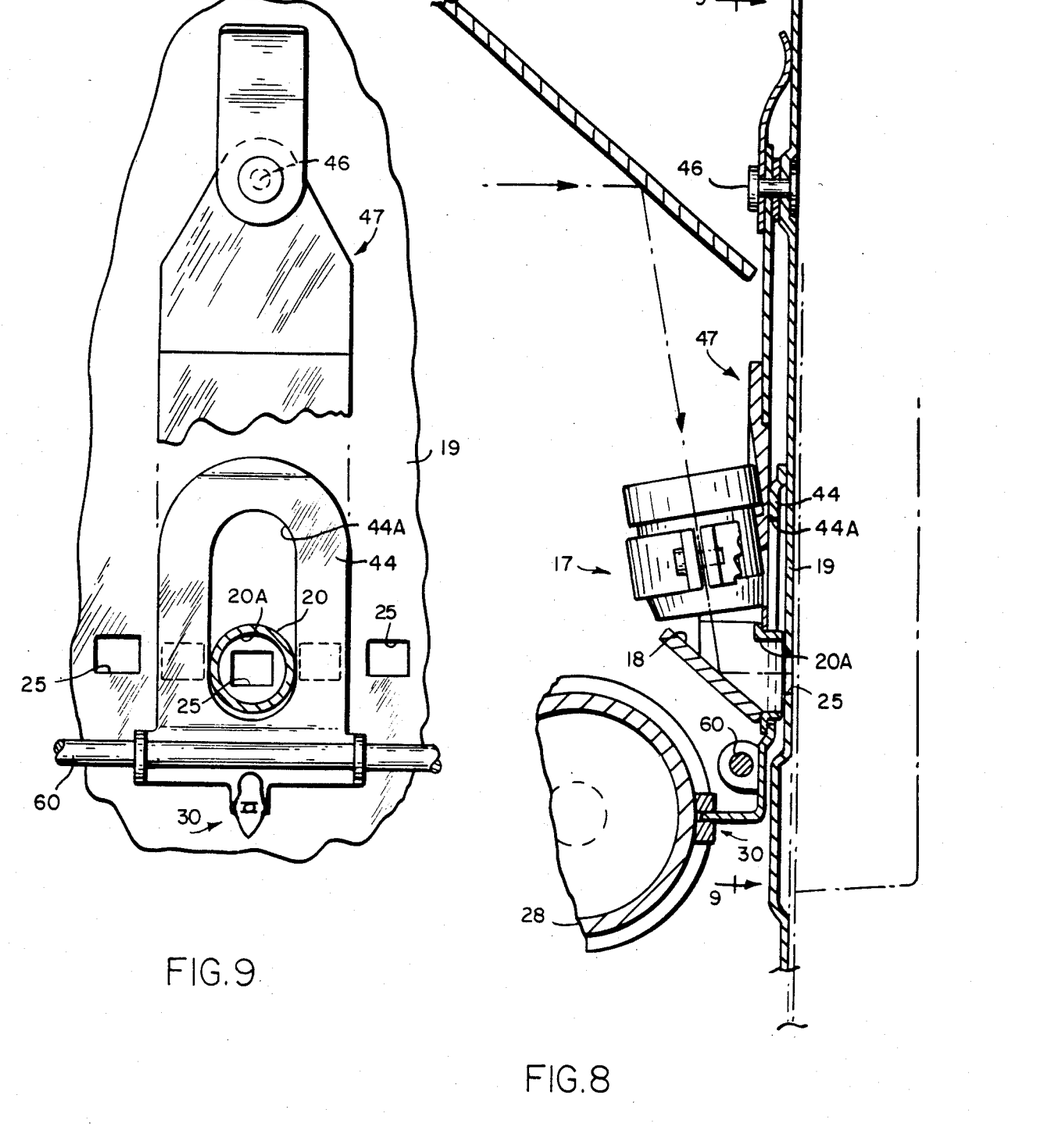
FIG. 8 is an enlarged view of portions of the optical arrangement shown in FIG. 5.
FIG. 9 is an elevational view, with elements cut away, taken along the line 9—9 of FIG. 8.

FIGS. 2 and 3 depict, in general diagrammatic form, the optics system within housing 11 which, in the particular embodiment shown, includes a first imaging lens assembly 15 used for focusing convenience, a second prime imaging lens assembly 17 and a pair of parallel reflecting surfaces 16 and 18. Light rays received generally along input axis 12A are appropriately directed by such system along an optical path which, in the embodiment shown, is in a first direction coincident with axis 12A, thence along a generally transverse direction 12B and finally along an output direction 12C generally parallel to and offset from axis 12A. A variable aperture system 24 (FIG. 3) is disposed between reflective surface 16 and prime lens assembly 17. Accordingly, light rays received along input axis 12A are ultimately directed through an aperture 20A (see FIG. 9) in a moving gate member 20 (in guide member 44) and through an aperture 25 of a fixed gate member 19, as later explained in detail with regard to FIG. 9, to a film unit 26 which is one of a plurality of such film units forming a film pack 21 appropriately stacked and held against fixed gate member 19, as explained in more detail below.

The optical arrangement, comprising lens assemblies 15 and 17, reflective surfaces 16 and 18, and a moving gate member 20, is appropriately mounted so as to be rotated about input axis 12A, as discussed in more detail below. Such optics system is rotated so that the light rays from reflective surface 18 pass through moving gate 20 and thence sequentially through each of a pluralty of apertures 25 in fixed gate 19 as moving gate 20 is sequentially positioned in register with each of apertures 25. The light rays thereupon form a plurality of successive images 27 on film unit 26 of film pack 21. The fixed apertures 25 are formed in gate 19 in an arcuate path which corresponds to the arc which is followed by the light rays along output axis 12C from reflective surface 18 as the overall optics system is rotated.

Accordingly, the plurality of images 27 are formed on film unit 26 in a corresponding arc thereon, as shown, for example, by arcuate row 26A. After the first arcuate row of images is formed, the optics system is rotated in the opposite direction so that a second row of images along an arc 26B is formed sequentially in the opposite direction, arcuate row 26B being substantially parallel to row 26A. The next rotating sweep of the optics system sequentially forms a third row of images along arc 26C, the process continuing in such an oscillating manner so that a plurality of parallel arcuate rows of sequentially formed images is formed on film unit 26, alternating rows being formed as the optics system rotates in a first direction (denoted by arrows 30) and in a second direction (denoted by arrow 31).

If the film unit is of a conventional size, such as that now designated as SX-70 film unit manufactured and sold by Polaroid Corporation, Cambridge, Mass., a single film unit may have placed thereon as many as 16 arcuate rows of 13 images providing approximately 208 separate images, which would approximate a scene of about 12 seconds.

FIGS. 4 through 9 show a specific embodiment in more detail with reference to the mechanical elements for moving the optics system and for moving each film unit in conjunction therewith. As can be seen therein, a barrel cam unit 28 has a boat-shaped cam follower 30 riding thereon, cam unit 28 being rotated by the rotary shaft of motor M1 via a suitable gear train 45. As cam follower 30 moves along cam 28 a moving gate guide member 44 moves linearly along a shaft 60, guide member 44 engaging moving gate 20 in slotted opening 44A. The linear movement of guide member 44 in turn moves gate member 20 and the boom assembly 47 on which it is affixed in an arcuate motion about boom assembly pivot axis 46.

Accordingly, the overall optics system, including movable gate 20, reflecting surfaces 16 and 18, and lens assemblies 15 and 17, mounted on boom assembly 47, rotates through an arc about input axis 12A which coincides with the pivot axis 46. After the optics system has rotated in a specified direction through each arcuate scan, the motion of cam follower 30 in barrel cam 28 causes the optics system to reverse its rotation so that a plurality of back-and-fourth scanning motions is thereby provided.

Figures 6, 7:
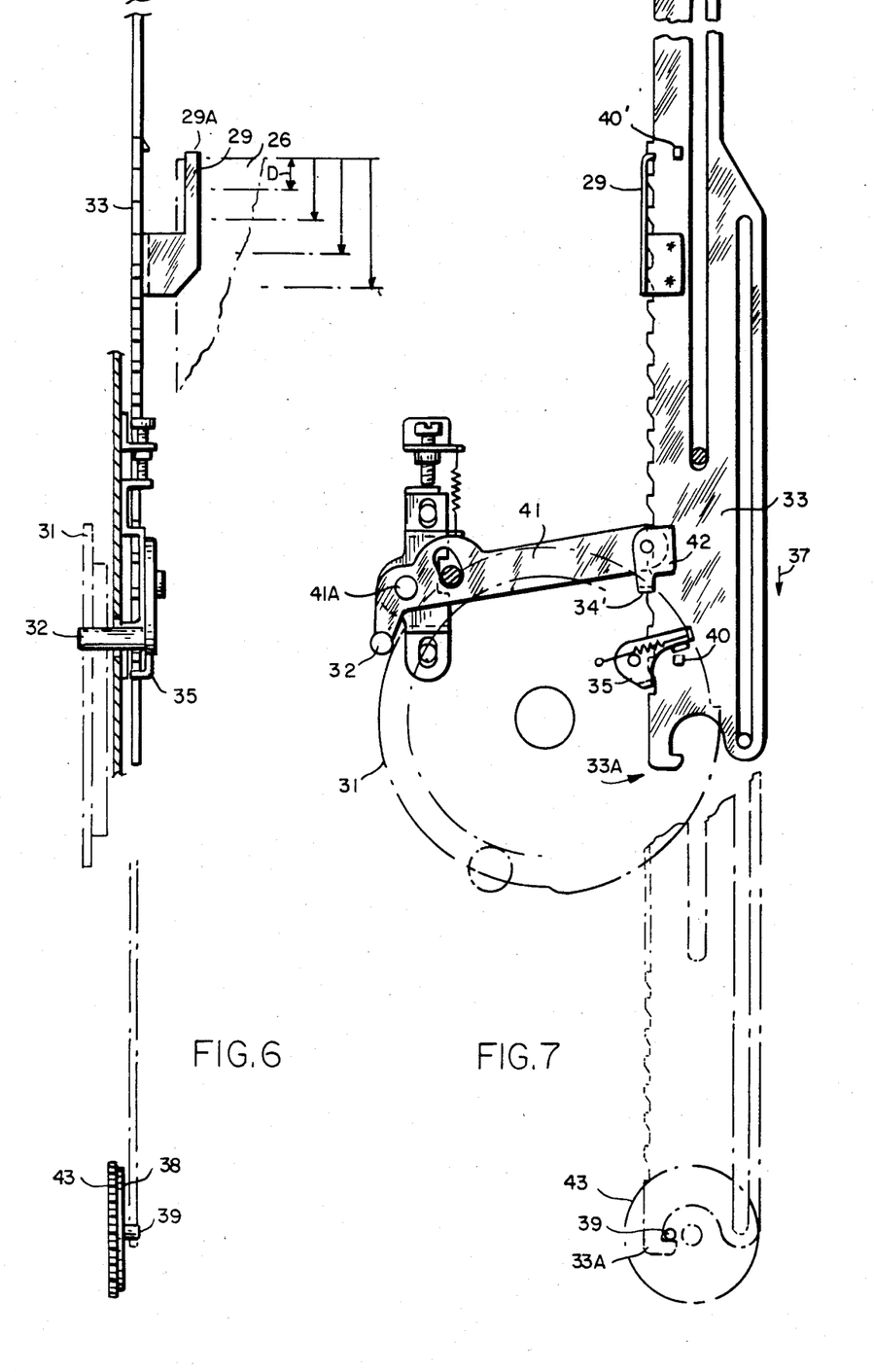
FIG. 6 shows a plan view of certain of the elements shown in FIG. 7.
FIG. 7 is a side elevational view taken along the line 7—7 of FIG. 4 and illustrating certain elements of the camera shown in FIG. 1.

After each scan has provided its corresponding arcuate row of images on the film unit, the latter unit must be advanced a specified linear distance to place the film unit in position relative to the fixed gate 19 ready for the next reverse scan. A ratchet and pawl system is utilized for such purpose, as shown in FIGS. 6 and 7, wherein ratchet member 33 carries advancing pick member 29, a tab end 29A of which (FIG. 3) extends over the rear edge 36 of film unit 26. As ratchet 33 moves a fixed distance "D" (FIG. 6), the film unit moves a corresponding distance, as shown. Such movement is achieved by utilizing a rotating cam 31 and cam follower 32 on cam follower arm 41. A first pawl 34, rotatably attached at the end of cam follower arm 41, engages a notch of ratchet 33 so that, when the cam follower arm rotates clockwise about axis 41A, pawl 34 moves linearly in the direction of arrow 37.

The engagement of pawl 34 with a notch of ratchet 33 causes the latter to move correspondingly in the same linear direction. The surface of cam 31 is arranged so that when the ratchet has moved a distance "D" the ratchet is locked into its new position by a second pawl 35, which is held in a first position by spring biasing means as shown. Cam follower arm 41 thereupon rotates in a counterclockwise direction to cause pawl 34 to move into engagement with the next successive notch of ratchet 33. The linear movement of ratchet 33 moves pick member 29, fixedly attached thereto, so that film unit 26 moves forward by the same distance.

When film unit 26 has been advanced to a position at which the final arcuate row of images is formed thereon, the claw end 33A of ratchet 33 is engaged by rotating pin 39 affixed to cam 38 which is in turn attached to gear 43 which causes the ratchet 33 to move forward rapidly so that the forward edge of film unit 26 is forced into frictional engagement with the nip of rollers 22. At such time motor M2 causes rollers 22 to rotate so that film unit 26 is drawn forward therethrough to exit from the camera housing. If film unit 26 is of the instant development type, such as an SX-70 film unit adapted to produce transparent images, for example, such rollers are used to spread the necessary chemical compositions associated with film unit 26 to produce such images substantially instantaneously in accordance with previously known techniques.

When the film unit is advanced to the spread rollers 22 by the engagement of rotating pin member 39 with claw end 33A of ratchet 33, the trailing edge of pawl member 35 is engaged by a projecting member 40' fixedly attached to ratchet 33. Pawl 35 thereupon rotates in a clockwise direction by a sufficient amount to cause it to assume a second position completely out of engagement with ratchet 33. Accordingly, ratchet 33 returns to its original position once it is so released from engagement with pawl 35 and with pin 39. Upon reaching such original position, a projecting member 40 thereon engages pawl 35 so as to rotate it in a counterclockwise direction whereupon it again locks ratchet 33 in its original position for a subsequent scanning sequence with respect to a new film unit which is moved in an appropriate position for such purpose.

Figure 10:
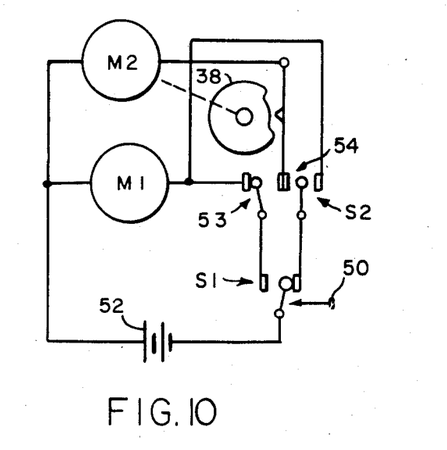
FIGS. 10-14 show circuit diagrams in five stages of operation of the motor circuitry used in the camera apparatus shown in FIGS. 1-9.
Figure 11:
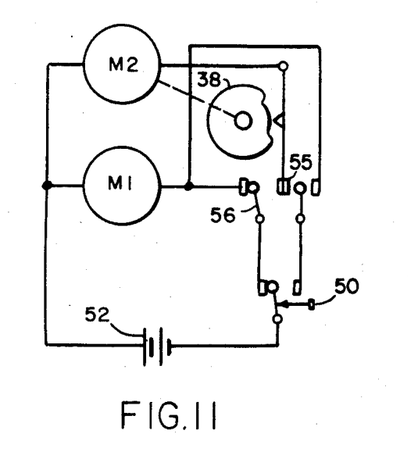

FIGS. 10–14 show the electrical control circuits for operating the scanning motor M1 and the spread motor M2 and, as shown, represent five stages in such operation. FIG. 10, for example, shows the camera at rest with cam 38 (see FIG. 7) in its dwell position and the "ON-OFF" button 50 at its OFF position so that a first switch S1 is in its normally closed position. During such stage, voltage source 52 is not applied to either motor M1 or M2 and the system is at rest. A second switch S2 has a first switch section 53, shown in its normally closed position, and a second switch section 54, shown in its normally neutral position. When a user desires to operate the camera to take a scene, button 50 is depressed to its ON position, thereby moving the movable contact of switch S1 to the position shown in FIG. 11 so that suitable voltage is supplied to scanning motor M1 and the optics system begins its scanning pattern, as discussed above. So long as button 50 is depressed scanning will proceed until all of the plurality of arcuate rows of images are formed on a single film unit, for example.

Figure 12:
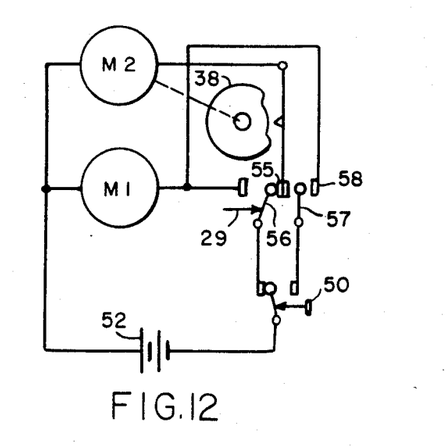
Figure 13:
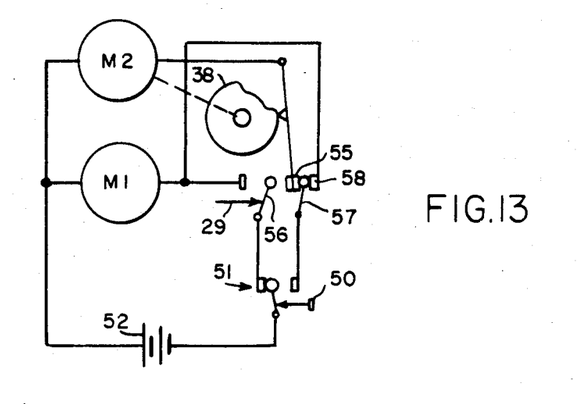

At such time, the pick member 29 has moved to a position at which it contacts the movable contact 56 of switch section 53 of switch S2, thereby moving it to its opposite position, as shown in FIG. 12. Movement of the movable contact 56 of switch section 53 removes the voltage from scanning motor M1, so that such motor stops, and applies such voltage to spread motor M2 to start the latter motor and cause the film unit to move toward the nip of spread rollers 22. Cam 38 jogs to the position indicated in FIG. 13 at which point the movable normally open contact member 55 of switch section 53 moves away from the movable center contact member 56 thereof to a position where it contacts movable center contact member 57 of switch section 54 to move member 57 into contact with fixed contact member 58 thereof. During such movement both the scan motor M1 and the spread motor M2 are temporarily stopped.

Figure 14:
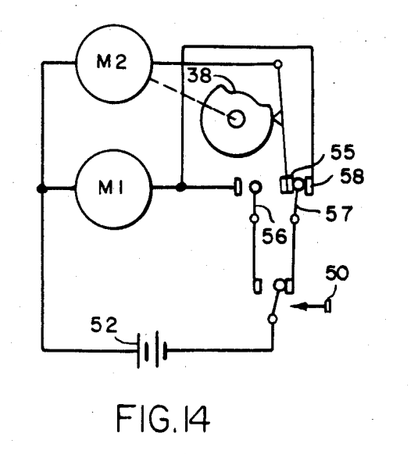

If the user does not release the start button 50, both motors remain stopped and the film unit remains within the camera housing and does not pass through the spread rollers 22. As shown in FIG. 14, as soon as button 50 is released, however, voltage is re-applied to spread motor M2 so that processing of the film unit occurs as the unit moves through rollers 22 and motor M1 returns the scanning system to its "start" position. The scanning and processing cycle is completed by the time that the cam 38 returns to its rest position, as shown in FIG. 10. In such position the contacts of switch section 54 are broken and the return of the pick releases the movable center contact of switch section 53 so that the rest position of FIG. 10 is restored.

Figure 15:
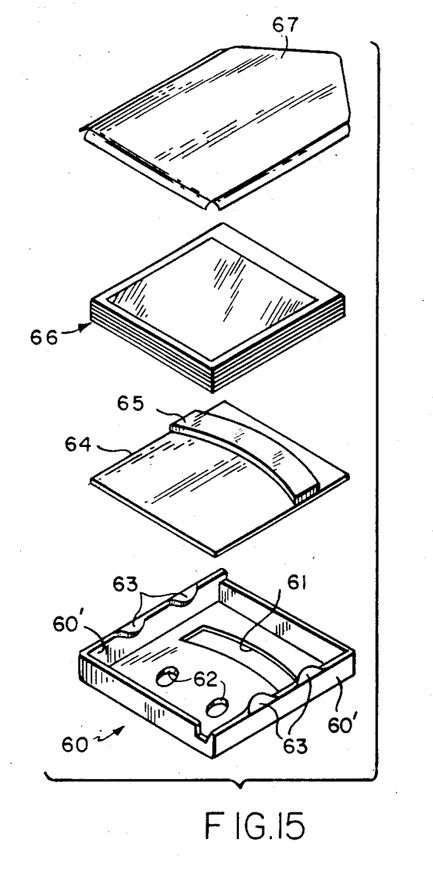
FIG. 15 shows an exploded view of a novel film pack used in the camera of FIGS. 1-9.

FIG. 15 shows an exploded view of a preferred embodiment of a film pack which can be used in the camera described above. The film pack 66, which comprises a stack of film units as discussed above, is held within a film box 60 at least two sides 60' of which have tabs 63 projecting therefrom to retain the film pack within box 60. A battery unit 64 is placed between the bottom of film pack 66 and the bottom of box 60. A pair of access openings 62 in the bottom of box 60 provide access to contact elements (not shown) on battery unit 64 when the overall package is assembled. Battery unit 64 has affixed thereto a resilient pressure pad 65 made of foam rubber, or the like. An opening 61 in the bottom of box 60 permits a spring member (not shown) which is located, for example, in the door of the camera to cause resilient pad 65 to come into pressure contact with the film pack to retain the film units snugly within the camera when the pack has been placed therein. A dark paper cover 67 is placed over the film pack, the folded edges thereof also being retained beneath the tabs 63 when the package is assembled.

Figure 16:
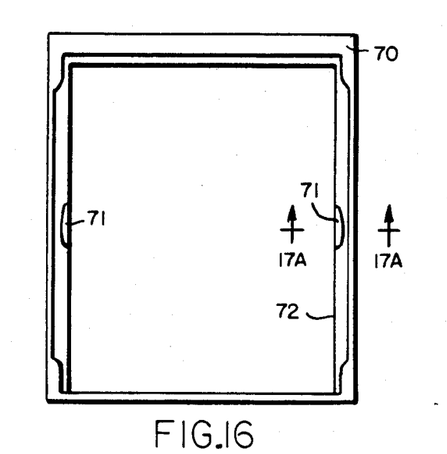
FIG. 16 shows a plan view of a frame member in the camera for retaining the film pack within the camera.
Figure 18:
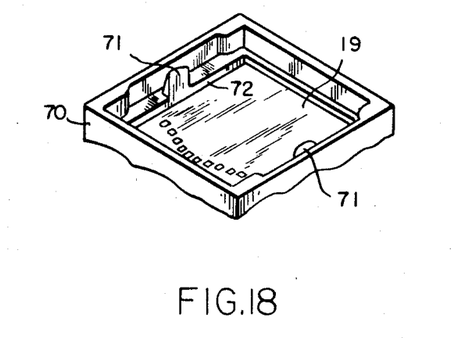
FIG. 18 is a view in perspective of the frame member of FIG. 16.

The film pack, packaged within box 60, is placed in a frame member 70 in the camera, the latter member being specifically shown in FIGS. 16 and 18 and more generally shown diagrammatically in FIG. 2. As can be seen in the latter figure, when placed therein the dark cover 67 can be removed so that the topmost film unit in the film pack rests adjacent the fixed gate member 19.

Figure 17A:
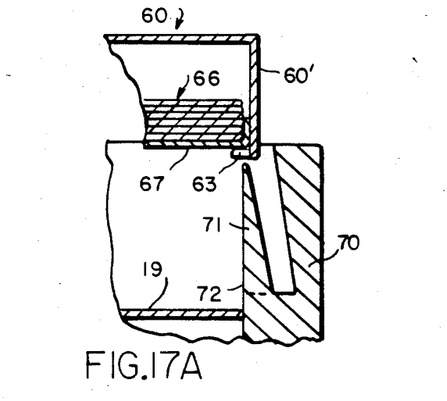
FIGS. 17A and 17B are sectional views of the frame member taken along line 17A—17A of FIG. 16 in cooperative engagement with the film pack of FIG. 15.
Figure 17B:
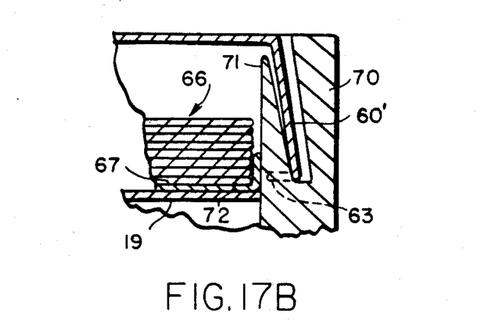

Frame member 70 has a wedge-shaped projection 71 substantially centrally located and projecting upwardly from the inner guide walls 72. As the film pack is inserted into frame member 70 (FIG. 17A) projections 71 cause the side walls 60' of box 60 to spread apart, as shown in FIG. 17B. The film pack 66 moves to a position between the inner guide walls 72, the film unit adjacent fixed gate 19 being ready for use when paper cover 67 is removed.

The particular embodiment depicted and described above is not intended to represent the only embodiment of the invention as modifications thereto will occur to those in the art. Thus, while the film unit depicted is described as being of the SX-70 type, other film units for producing either positive image prints or positive or negative transparencies can be utilized depending on the application for which the camera is used. Moreover, while the camera is specifically depicted as being for use in taking motion pictures, it may be adapted for producing a plurality of separate still pictures, either as prints or as transparencies, on a single film unit.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A motion picture film unit having a plurality of sequentially recorded images in arcuate rows formed by the method comprising the steps of:

supporting said film unit in a given film plane;

intermittently directing scene light from a photographic scene to spaced areas of said film plane to produce images thereat, said directing step including directing scene light along a first path generally parallel to said film plane and then along a second path generally normal thereto;

pivoting said first path around an axis spaced from said second path and generally normal to said film plane to produce an arcuate row of images in said film unit;

advancing said film unit, at the completion of each said arcuate row, in a direction substantially normal to said arcuate path to provide an unexposed film portion in said spaced areas; and repeating said directing and advancing steps to record a plurality of image rows in said film unit.

2. The film unit of claim 1 wherein said method includes reversing the direction of pivoting of said first path for alternate rows of images.

3. The film unit of claim 1 wherein said film unit is rectangular, and said pivoting step includes pivoting said first path around an axis substantially normal to said film unit to provide arcuate rows substantially normal to one major axis thereof, and said advancing step includes advancing said film unit in a direction substantially parallel to said one major axis.

* * * * *